US012786511B2

(12) United States Patent
Blake et al.

(10) Patent No.: US 12,786,511 B2
(45) **Date of Patent: *Nov. 3, 2026**

(54) METHOD AND SYSTEM FOR TRANSFERRING AN INTERACTIVE FEATURE TO ANOTHER DEVICE

(71) Applicant: Adeia Guides Inc., San Jose, CA (US)

(72) Inventors: John Blake, Belmont, CA (US); Milan Patel, Santa Clara, CA (US); Rowena Young, Menlo Park, CA (US); Jean Michel Pierre Bourdon, Emerald Hills, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/015,147

(22) Filed: Jan. 9, 2025

(65) Prior Publication Data

US 2025/0150673 A1 May 8, 2025

Related U.S. Application Data

(63) Continuation of application No. 18/213,446, filed on Jun. 23, 2023, now Pat. No. 12,231,726, which is a
(Continued)

(51) Int. Cl.
*H04N 21/414* (2011.01)
*G06F 16/40* (2019.01)
(Continued)

(52) U.S. Cl.
CPC ....... *H04N 21/44218* (2013.01); *G06F 16/40* (2019.01); *G06F 16/48* (2019.01);
(Continued)

(58) Field of Classification Search
None
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

CN 101385335 A 3/2009
CN 101635706 A 1/2010
(Continued)

OTHER PUBLICATIONS

"Method and System for Transferring an Interactive Feature To Another Device", International Search Report and Written Opinion in International Application No. PCT/US2017/039489, mailed Aug. 16, 2017 (20 pages), Aug. 16, 2017, 20.

*Primary Examiner* — Brian T Pendleton
*Assistant Examiner* — Jean D Saint Cyr
(74) *Attorney, Agent, or Firm* — HG LAW LLP

(57) ABSTRACT

Methods and systems are presented for transferring an interactive feature from a first device to a second device. Two users may be consuming a media asset. Upon receipt of a command to active an interactive feature, a determination is made whether a user who did not activate the interactive feature is interested in the media asset. Upon that determination, a timer is activated that tracks an amount of time for which the interactive feature is active and a determination is made whether a threshold time period has been met. Once the threshold time period is met, a device associated with the user that activated the interactive feature is identified and the users are prompted to transfer the interactive feature to the device.

20 Claims, 7 Drawing Sheets

Related U.S. Application Data continuation of application No. 17/159,562, filed on Jan. 27, 2021, now Pat. No. 11,729,462, which is a continuation of application No. 15/200,638, filed on Jul. 1, 2016, now Pat. No. 10,939,164.

(60) Provisional application No. 62/334,202, filed on May 10, 2016.

(51) Int. Cl.

| | |
|---|---|
| ***G06F 16/48*** | (2019.01) |
| ***H04H 20/38*** | (2008.01) |
| ***H04H 60/56*** | (2008.01) |
| ***H04H 60/80*** | (2008.01) |
| ***H04N 21/231*** | (2011.01) |
| ***H04N 21/234*** | (2011.01) |
| ***H04N 21/25*** | (2011.01) |
| ***H04N 21/41*** | (2011.01) |
| ***H04N 21/422*** | (2011.01) |
| ***H04N 21/43*** | (2011.01) |
| ***H04N 21/431*** | (2011.01) |
| ***H04N 21/433*** | (2011.01) |
| ***H04N 21/442*** | (2011.01) |
| ***H04N 21/45*** | (2011.01) |
| ***H04N 21/458*** | (2011.01) |
| ***H04N 21/472*** | (2011.01) |
| ***H04N 21/482*** | (2011.01) |
| ***H04N 21/83*** | (2011.01) |
| ***H04N 21/845*** | (2011.01) |

(52) U.S. Cl.

CPC ............ *H04H 20/38* (2013.01); *H04H 60/56* (2013.01); *H04H 60/80* (2013.01); *H04N 21/23113* (2013.01); *H04N 21/252* (2013.01); *H04N 21/4126* (2013.01); *H04N 21/41265* (2020.08); *H04N 21/431* (2013.01); *H04N 21/4334* (2013.01); *H04N 21/4532* (2013.01); *H04N 21/458* (2013.01); *H04N 21/47217* (2013.01); *H04N 21/4821* (2013.01); *H04N 21/83* (2013.01); *H04N 21/845* (2013.01)

(56) References Cited

U.S. PATENT DOCUMENTS

| | | | | |
|---|---|---|---|---|
| 7,165,098 | B1 | 1/2007 | Boyer et al. | |
| 7,761,892 | B2 | 7/2010 | Ellis et al. | |
| 8,046,801 | B2 | 10/2011 | Ellis et al. | |
| 9,652,783 | B2 | 5/2017 | Roberts et al. | |
| 10,048,924 | B2 | 8/2018 | Felkai et al. | |
| 10,939,164 | B2 | 3/2021 | Blake et al. | |
| 11,729,462 | B2 | 8/2023 | Blake et al. | |
| 2002/0174430 | A1 | 11/2002 | Ellis et al. | |
| 2004/0107439 | A1 | 6/2004 | Hassell et al. | |
| 2005/0160465 | A1 | 7/2005 | Walker | |
| 2005/0251827 | A1 | 11/2005 | Ellis et al. | |
| 2007/0168884 | A1 | 7/2007 | Weeks et al. | |
| 2007/0271137 | A1* | 11/2007 | Vezza | G06Q 10/0631 705/14.39 |
| 2009/0113481 | A1* | 4/2009 | Friedman | H04N 21/4532 725/46 |
| 2009/0146775 | A1 | 6/2009 | Bonnaud et al. | |
| 2010/0153885 | A1 | 6/2010 | Yates | |
| 2012/0110618 | A1 | 5/2012 | Kilar et al. | |
| 2012/0324518 | A1 | 12/2012 | Thomas et al. | |
| 2013/0046641 | A1 | 2/2013 | Devree | |
| 2013/0047175 | A1* | 2/2013 | Ramirez Flores | H04N 21/4223 725/12 |
| 2014/0007154 | A1 | 1/2014 | Seibold et al. | |
| 2014/0201767 | A1 | 7/2014 | Seiden et al. | |
| 2014/0296166 | A1 | 10/2014 | Lyles et al. | |
| 2014/0331242 | A1 | 11/2014 | De La Garza et al. | |
| 2015/0067709 | A1 | 3/2015 | Meredith et al. | |
| 2015/0231236 | A1 | 8/2015 | Pordy et al. | |
| 2015/0306281 | A1 | 10/2015 | Rajamannan | |
| 2015/0319400 | A1 | 11/2015 | Golyshko | |
| 2015/0350729 | A1 | 12/2015 | Reynolds | |
| 2015/0382052 | A1* | 12/2015 | Pearlman | H04N 21/44226 725/46 |
| 2016/0080510 | A1 | 3/2016 | Dawoud et al. | |
| 2016/0127766 | A1 | 5/2016 | Luk et al. | |
| 2017/0332140 | A1 | 11/2017 | Blake et al. | |
| 2018/0218394 | A1 | 8/2018 | Kerns | |
| 2021/0152884 | A1 | 5/2021 | Blake et al. | |
| 2024/0031645 | A1 | 1/2024 | Blake et al. | |

FOREIGN PATENT DOCUMENTS

| | | | |
|---|---|---|---|
| CN | 103797508 | A | 5/2014 |
| EP | 2403239 | A1 | 1/2012 |
| EP | 2453596 | A2 | 5/2012 |
| EP | 2797316 | A2 | 10/2014 |
| JP | 2011196345 | A | 10/2011 |
| TW | 1273566 | B | 2/2007 |
| WO | 03032634 | A2 | 4/2003 |
| WO | 2006061770 | A1 | 6/2006 |
| WO | 2006113655 | A1 | 10/2006 |
| WO | 2011037761 | A1 | 3/2011 |
| WO | 2015061431 | A1 | 4/2015 |

* cited by examiner

METHOD AND SYSTEM FOR TRANSFERRING AN INTERACTIVE FEATURE TO ANOTHER DEVICE

CROSS-REFERENCE TO RELATED APPLICATIONS

This application is a continuation of U.S. patent application Ser. No. 18/213,446, filed Jun. 23, 2023, which is a continuation of U.S. patent application Ser. No. 17/159,562, filed Jan. 27, 2021, now U.S. Pat. No. 11,729,462, which is a continuation of U.S. patent application Ser. No. 15/200,638, now U.S. Pat. No. 10,939,164, filed Jul. 1, 2016, which claims the benefit of U.S. Provisional Application No. 62/334,202, filed May 10, 2016. The disclosures of which are hereby incorporated by reference herein in their entireties.

BACKGROUND

People often consume media content together with others. For example, husbands and wives watch TV together and friends get together to watch sporting events on television. Media content often includes interactive features that may be accessed by a user (e.g., product information, product purchase options, sports statistics, highlights reels, and other interactive features). For example, when an advertisement is displayed within a program or while the program is paused, the user is able to select an interactive feature in order to get more information on the product that may be of interest to the user. However, current systems do not account for the convenience of another user or users that are simultaneously consuming the media asset from the same device. At best, current systems pause the media asset at a point where the interactive feature has been activated and record the content that is missed by the other users.

SUMMARY

Therefore, current systems do not recognize that other users in the room may get impatient when the interactive feature is activated by one of the users. As current systems do not recognize that other users may get impatient when an interactive feature is activated by a user, these systems do not provide a mechanism to prevent the other users from getting impatient or annoyed while the interactive feature is active. Thus, methods and systems are presented for transferring an interactive feature from a first device to a second device. A system implementing this concept may detect that two users are consuming a media asset on one device and, upon receipt of a command to activate an interactive feature, may determine whether a user who did not activate the interactive feature is interested in the media asset. Upon that determination, a timer is activated that tracks an amount of time for which the interactive feature is active and determines whether a threshold time period has been met. Once the threshold time period is met, the system may identify a device associated with the user that activated the interactive feature and may prompt the user to transfer the interactive feature to the device.

In some aspects, a media guidance application may be configured to transfer an interactive feature from a first device to a second device. The media guidance application may detect that a first user and a second user are consuming a media asset on a first device. For example, two friends may be watching a movie on a television. The media guidance application may use a camera to detect the two people.

The media guidance application may receive, from the second user, a command to activate an interactive feature on the first device, thereby interrupting consumption of the media asset by the first user. For example, the second user may notice a product on the screen (e.g., during a commercial break or while the media asset is playing) and may want more information on the product. As a result, the media guidance application may receive a command from the user (e.g., via a voice interface or a product selection using a remote control) to get more information on the product.

In response to receiving the command, the media guidance application may compare data of a first profile associated with the first user with metadata of the media asset to determine whether the media asset is of interest to the first user and determine, based on the comparing, that the metadata associated with the media asset matches the data of the first profile. For example, if a profile associated with the first user matches a genre of romance and the metadata associated with the media asset contains a keyword romance, then the media guidance application may determine that the user is interested in the media asset.

In response to determining that the metadata associated with the media asset matches the data of the first profile, the media guidance application may take the following actions. The media guidance application may activate a timer that tracks a period of time that the interactive feature has been active on the first device, and determine that the period of time for which the interactive feature has been active is greater than a threshold. For example, the media guidance application may activate a timer when the interactive feature is activated, and continue tracking how long the feature has been active. The media guidance application may determine a threshold value for comparison with the timer's elapsed time. For example, each user may have an associated time period that indicates when a user becomes impatient while consuming media that the user is not interested in. The media guidance application may use this time period as the threshold. The time period may be stored in the user's profile. The media guidance application may retrieve that time period and compare it with the timer to determine whether the threshold has been met.

In response to determining that the period of time is greater than the threshold, the media guidance application may identify a second device that is associated with the second user, and prompt the second user with a selectable option to transfer the interactive feature from the first device to the second device. For example, the media guidance application may detect (e.g., via a wireless connection) all accessible devices and then determine which device is associated with the second user. The media guidance application may generate for display a prompt to transfer the product information displayed on the first device to the second device.

In some embodiments, it may be useful not to prompt the first user or the second user to transfer the interactive feature because the first user is not interested in the media asset and, thus, will not get impatient. For example, a husband and a wife may be watching a romantic comedy, when the wife activates the interactive feature. The media guidance application may determine that the husband is not interested in romantic comedies, thus, determining that he may not become impatient while the wife is exploring the interactive feature because, for example, he is not interested in the media asset and doesn't mind the delay. In response to determining that the metadata associated with the media asset does not match the data of the first profile, the media guidance application may refrain from activating the timer and refrain from prompting the second user with the selectable option to transfer the interactive feature from the first device to the second device. For example, if the media guidance application determines that the first user is not interested in romance as a genre, based on the user's profile, then the user may not get impatient when the interactive feature is active. Thus, the media guidance application may not prompt the user to transfer the interactive feature to the second device. Additionally or alternatively, the media guidance application may not start the timer as there may not be a need for it if no prompt is to be generated.

In some embodiments, it may be useful to keep the interactive feature active for a longer period if both users are interested in the interactive feature. If the first user is also interested in the interactive feature, the first user may not become impatient as quickly. The media guidance application may determine, based on the data in the first profile associated with the first user, that the first user is interested in the interactive feature, and increase the threshold based on the determining. For example, the media guidance application may receive a command from the second user to activate an interactive feature that provides more information about an upcoming release of a movie. The media guidance application may determine that the first user may be interested in the upcoming movie and, based on that, double the threshold. It should be noted that the threshold is increased based on the first user being interested in the content associated with the interactive feature.

The media guidance application may identify the second device that is associated with the second user by taking the following actions. The media guidance application may detect a plurality of accessible devices. For example, the media guidance application may reside on a device that has a wireless connection (e.g., WIFI or Bluetooth). The media guidance application may detect all accessible devices that are transmitting a wireless signal (whether connected to a wireless network or not). The media guidance application may determine, based on a second user profile associated with the second user, that a device of the plurality of accessible devices is associated with the second user, and identify the device as the second device. For example, the profile associated with the second user may include a list of devices associated with that user. The media guidance application may compare the devices in the user's profile to the plurality of accessible devices to determine whether there is a match. If one of the devices matches, the media guidance application may identify the matching device as the second device. Additionally or alternatively, the media guidance application may transmit a signal to all devices that instructs the second user to identify his or her device. When the media guidance application receives a response from one of the devices identifying a device associated with the second user, the media guidance application may select that device as the second device.

In some embodiments, it may be useful to generate a prompt on the second device. The media guidance application may, when prompting the second user with the selectable option to transfer the interactive feature from the first device to the second device, prompt the second user on the second device. For example, if the second user has an associated smart phone, the media guidance application may prompt the second user on that smart phone. It should be noted that the media guidance application may prompt the second user on the second device in addition to or instead of prompting the second user on the first device.

In some embodiments, the media guidance application may generate the threshold, store the threshold in the first profile and retrieve the threshold from the first profile. The media guidance application may generate the threshold by taking the following actions. The media guidance application may determine that media currently being consumed by the first user has been interrupted by an advertisement. For example, the first user may be watching a movie and the movie may be interrupted by the advertisement. The media guidance application may detect that the first user started disregarding the advertisement. For example, the media guidance application may detect (via a camera) that the user is no longer watching the advertisement. The media guidance application may generate the threshold based on a time period between a first time when the media was interrupted by the advertisement and a second time when the first user started disregarding the advertisement. It should be noted that the threshold time period in this instance is based on how quickly the first user gets distracted when watching an advertisement (arguably content that the user is not interested in). For example, if the advertisement starts at a specific time and the user gets distracted 30 seconds later, the media guidance application may determine that the threshold is 30 seconds. It should be noted that this process may be repeated multiple times in order to get a better threshold value (e.g., by averaging all the repetitions).

In some embodiments, it may be useful to transfer the interactive feature back to the first device, for example, when the first user is disregarding the media asset being played. The media guidance application may receive a user selection of the selectable option and transfer the interactive feature from the first device to the second device. For example, upon receipt of the user selection, the media guidance application may detect the second device, as described above, and stream the content associated with the interactive feature to the second device.

The media guidance application may detect that the first user is disregarding the media asset, and in response to detecting that the first user is disregarding the media asset, generate for display a selectable option to transfer the interactive feature from the second device back to the first device. For example, the media guidance application may determine that the first user is disregarding the media asset by using a camera to track the first user's eyes and if the user is not looking in the direction of the first device, the media guidance application may determine that the user is disregarding the media asset. When the media guidance application determines that the user is disregarding the media asset, it may generate for display a visual indicator (e.g., an icon, and/or text) that when selected will transfer the interactive feature back to the first device. The media guidance application may make the transfer by stopping to stream the content associated with the interactive feature to the second device.

In some embodiments, it may be useful to detect that the user is disregarding the media asset when a user gets distracted for a non-trivial or substantial period of time. For example, it may not be useful to detect that the user is disregarding the media asset if a user gets distracted for five seconds. The media guidance application may, when detecting that the first user is disregarding the media asset, detect that the user's eyes are not turned in the direction of the media asset, and activate a timer that tracks a period of time that the user's eyes are not turned in the direction of the media asset. The media guidance application may perform the detection by utilizing a camera that may be built-in or connected to a device where the media guidance application resides (e.g., the first device).

The media guidance application may determine, based on the timer, that the period of time for which the user's eyes are not turned in the direction of the media asset is greater than a threshold, and based on the determining, detect that the user is disregarding the media asset. For example, if the user gets distracted by a short text message, the threshold may not be met and the media guidance application may not determine that the user is disregarding the media asset. However, if the user gets distracted by a long phone call, the media guidance application may detect that the user is disregarding the media asset.

In some embodiments, it may be useful to prompt the second user to transfer the interactive feature to a device associated with the first user, for example, when the second user does not have an associated device that is accessible. The media guidance application may detect a plurality of accessible devices and determine that a first accessible device of the plurality of accessible devices is associated with the first user. For example, the media guidance application may access a profile associated with the first user and retrieve a list of devices associated with the first user. The media guidance application may compare the plurality of accessible devices to the list of devices associated with the user. If the media guidance application identifies a match, the media guidance application may determine that a device associated with the first user is found.

The media guidance application may generate for display, on the first accessible device, a prompt to transfer the interactive feature to the first accessible device. The media guidance application may then generate a prompt on the identified device that is associated with the first user. In some embodiments, this process may be performed after the media guidance application determines that an accessible device associated with the second user cannot be found.

DETAILED DESCRIPTION

Figure 1:
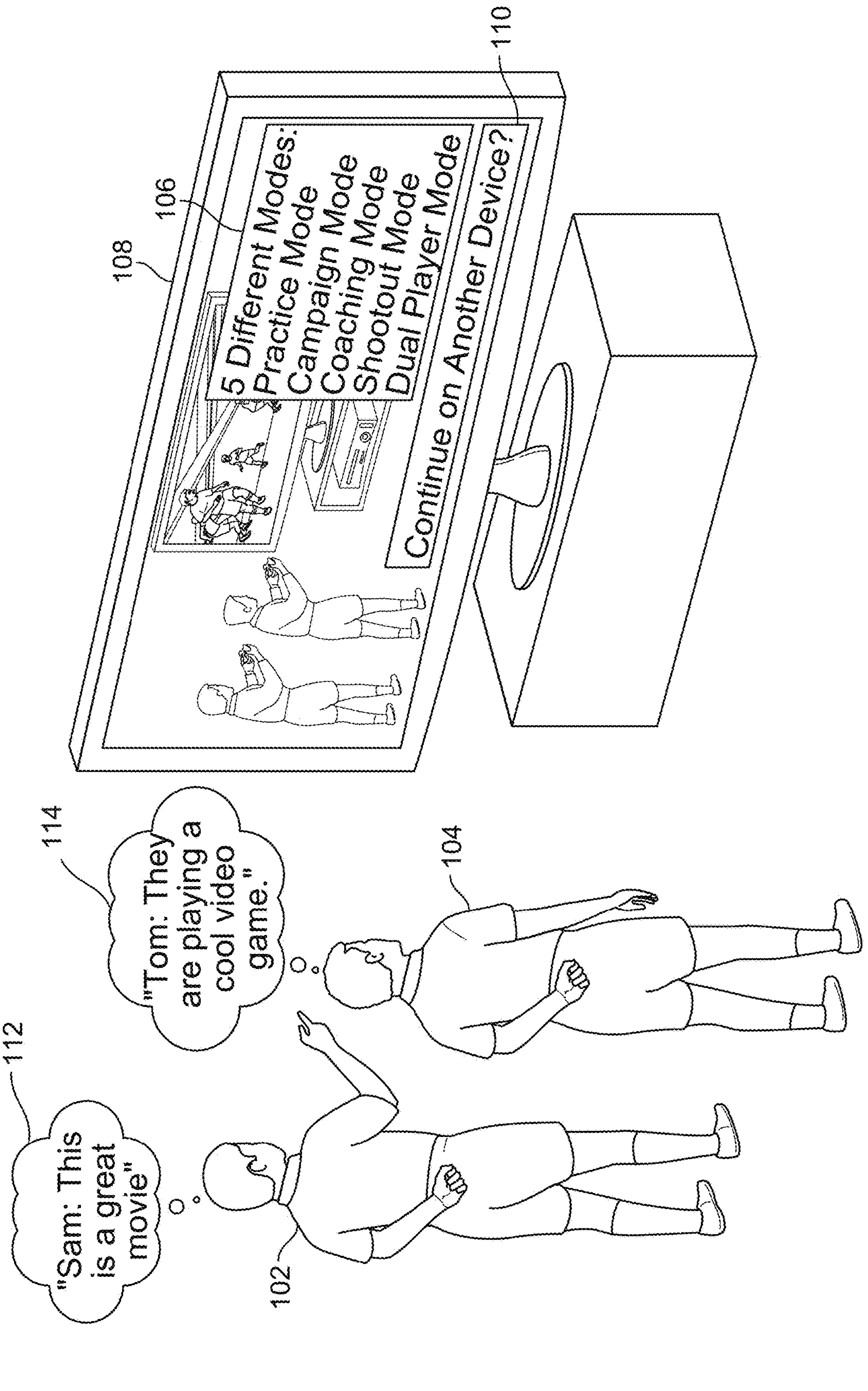
FIG. 1 shows an illustrative embodiment of a display screen for generating for display a prompt to transfer an interactive feature from a first device to a second device, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

Systems and methods are described herein for a media guidance application enabled to transfer an interactive feature from a first device to a second device. It should be noted that these systems and methods will be described in a context of a media guidance application. However, a person skilled in the art will understand that these systems and methods may be implemented independently of a media guidance application. Various interactive features may be available to a user of an interactive media guidance application. For example, additional product information may be available when the associated product appears in a media asset (e.g., a program or an advertisement). The interactive media guidance application may store the product information as supplemental data. That supplemental data may be received from a remote server (e.g., media content source 616 or media guidance data source 618, as discussed below in relation to FIGS. 3-6). The supplemental data may be associated with a particular media asset (e.g., a program or an advertisement). Furthermore, the supplemental data may be associated with a specific time period within the media asset. For example, the media guidance application may store metadata associated with a media asset. The metadata may include one or more entries that indicate that an interactive feature is associated with the media asset and the time period during which a respective interactive feature is available. Moreover, the metadata may store a link to the supplemental data that includes the additional product information. It should be noted that other interactive features (e.g., highlight reels, sports statistics, etc.) may be associated with media assets in the same manner. During the time period when the product is being shown within the media asset, the media guidance application may generate for display an indicator indicating availability of an interactive feature associated with the product.

FIG. 1 shows an illustrative embodiment of a display screen for generating for display a prompt to transfer an interactive feature from a first device to a second device. As depicted in FIG. 1, users 102 and 104 are watching a movie on user equipment 108 (e.g., a TV), where two actors are playing a video game. As evidenced from thought bubbles 112 and 114, respectively, user 102 is interested in the movie while user 104 is interested in the video game that is being played by the two actors in the movie. The movie that the two users are watching may have an associated interactive feature that when activated, for example, enables a user to get more information on the video game and/or purchase the video game. User 104 may activate the interactive feature by, for example, a voice command. It should be noted that user 104 may activate the interactive feature by other means. For example, user 104 may use a remote control to select the game on the screen or bring up a new screen that will show all available interactive features.

The media guidance application may receive a user command to activate the interactive feature and generate for display overlay 106. Overlay 106 may include information about a product associated with the interactive feature, in this instance the video game that the two actors are playing. Additionally or alternatively, overlay 106 may include other options for the user. For example, overlay 106 may include an option to purchase the game, an option to go to a website that enables a user to purchase the game, an option to transmit a purchased game to the user's game system, as well as other options.

As the interactive feature is active, user 102 may become impatient because user 102 is interested in the movie being shown and wants to continue watching the movie. User 102 may have an associated threshold time period after which time the media guidance application may determine that user 102 has become impatient. When the media guidance application determines that user 102 has become impatient (e.g., a threshold has been met), the media guidance application may generate for display overlay 110, which generates for display an option to continue on another device. In some embodiments, when overlay 110 is be generated for display, overlay 106 may be removed. In some embodiments, both overlay 106 and overlay 110 may appear on the screen as illustrated in FIG. 1. In some embodiments, overlay 110 may not be generated for display on the television, but instead be generated on a second device to where the interactive feature will be transferred. In some embodiments, the media guidance application may generate overlay 110 on both the television and the device to where the interactive option will be transferred.

Figure 2:
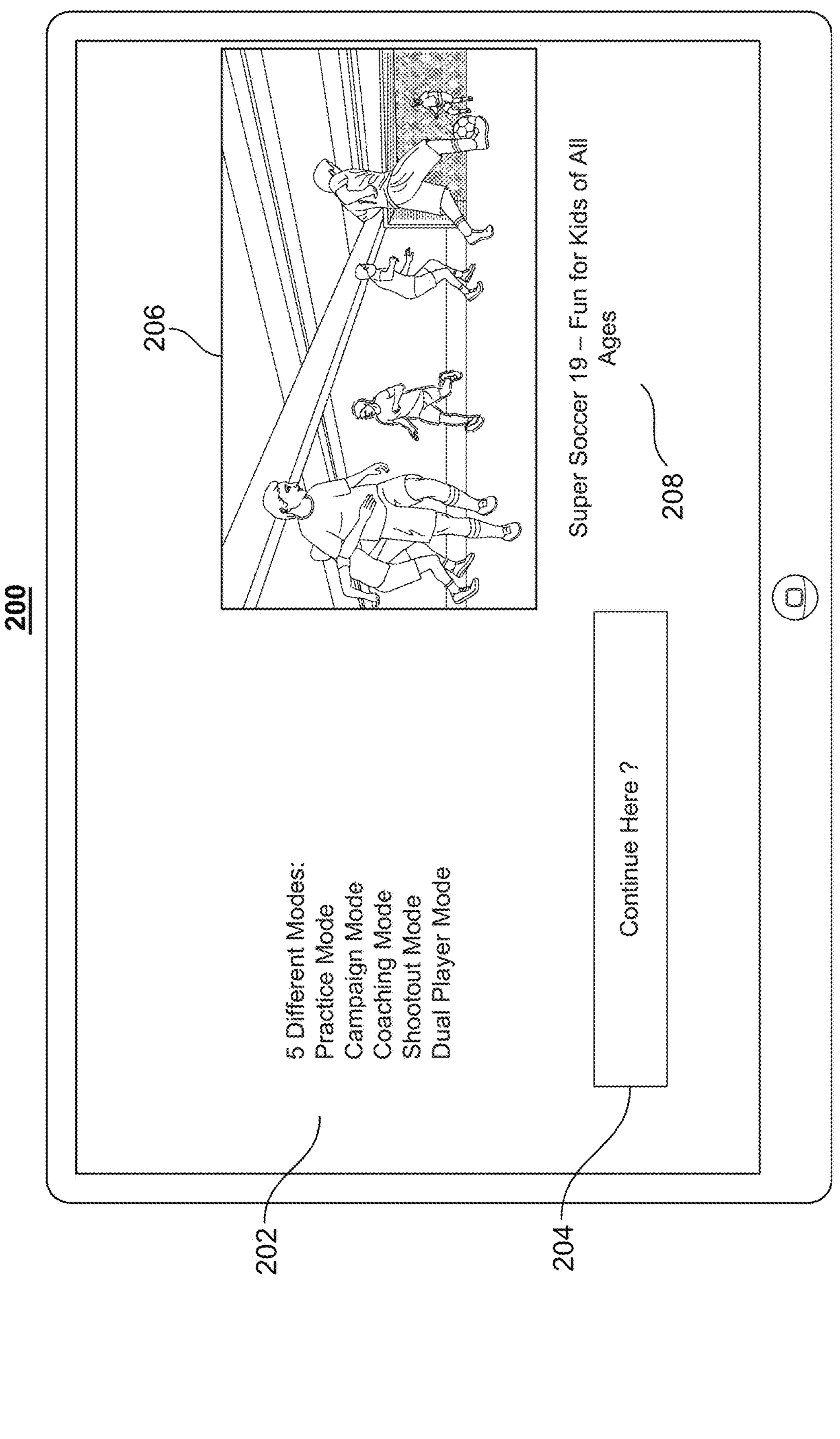
FIG. 2 shows another illustrative embodiment of a display screen for generating for display a prompt to transfer an interactive feature from a first device to a second device, in accordance with some embodiments of the disclosure.

FIG. 2 shows another illustrative embodiment of a display screen for generating for display a prompt to transfer an interactive feature from a first device to a second device. Display screen 200 may be a display screen of an electronic tablet where the media guidance application is running. The media guidance application may have identified the electronic tablet as the device to where the interactive feature is to be transferred. Area 202 may include information about the product (e.g., the video game) that is associated with the interactive feature. Picture 206 may be a screen shot of the video game or another graphic associated with the game, and area 208 may include the title of the video game. Prompt 204 may be a selectable option that initiates a transfer of the interactive feature to the electronic tablet.

In some embodiments, information in area 202, picture 206, and title 208 may be transmitted from the device from which the media asset is consumed (e.g., user equipment 108). For example, when the media guidance application determines that an electronic tablet is associated with the second user (e.g., the electronic tablet depicted in FIG. 2), the media guidance application may transmit the supplemental data from the device where the media asset is consumed (e.g., user equipment 108). The supplemental data may be displayed on the electronic tablet in the same manner as it is displayed on user equipment 108.

In some embodiments, however, information 202, screen shot 206 and title 208 may be received from a different source (e.g., media content source 616 and/or media guidance data source 618). For example, the media guidance application residing on user equipment 108 may transmit a command to the electronic tablet of FIG. 2, instructing the tablet to contact a server (e.g., a server associated with media content source 616 and/or a server associated with media guidance data source 618). The electronic tablet may contact the server and retrieve information associated with the interactive feature (e.g., information in area 202, screen shot 206, and title 208. It should be noted that other information may be retrieved from the server (e.g., ratings associated with the game).

In some embodiments, when the second user selects option 204, the media guidance application may transfer the interactive option to the electronic tablet of FIG. 2. In some embodiments, when the transfer is completed, a media guidance application associated with an electronic tablet may control the interactive feature. For example, the media guidance application on the electronic tablet may request more information on the game being shown. For example, the electronic tablet may request more screen shots, or videos of game play so that a user is able to make a decision on whether to purchase the game. In some embodiments, picture 206, may be replaced by other screen shots of the video game or videos of the video game.

In some embodiments, the media guidance application on the device associated with the second user (e.g., electronic tablet of FIG. 2) may generate for display an option to purchase the product (e.g., the video game). Various purchase options may be available for the user. For example, if the product is a movie, the media guidance application associated with the electronic tablet may automatically download the movie to the tablet upon purchase. If the product is the video game, the media guidance application may install different versions of the video game on different devices (e.g., an electronic tablet version, a computer version, or another suitable version) so that the user is able to play the game on different devices.

Figure 3:
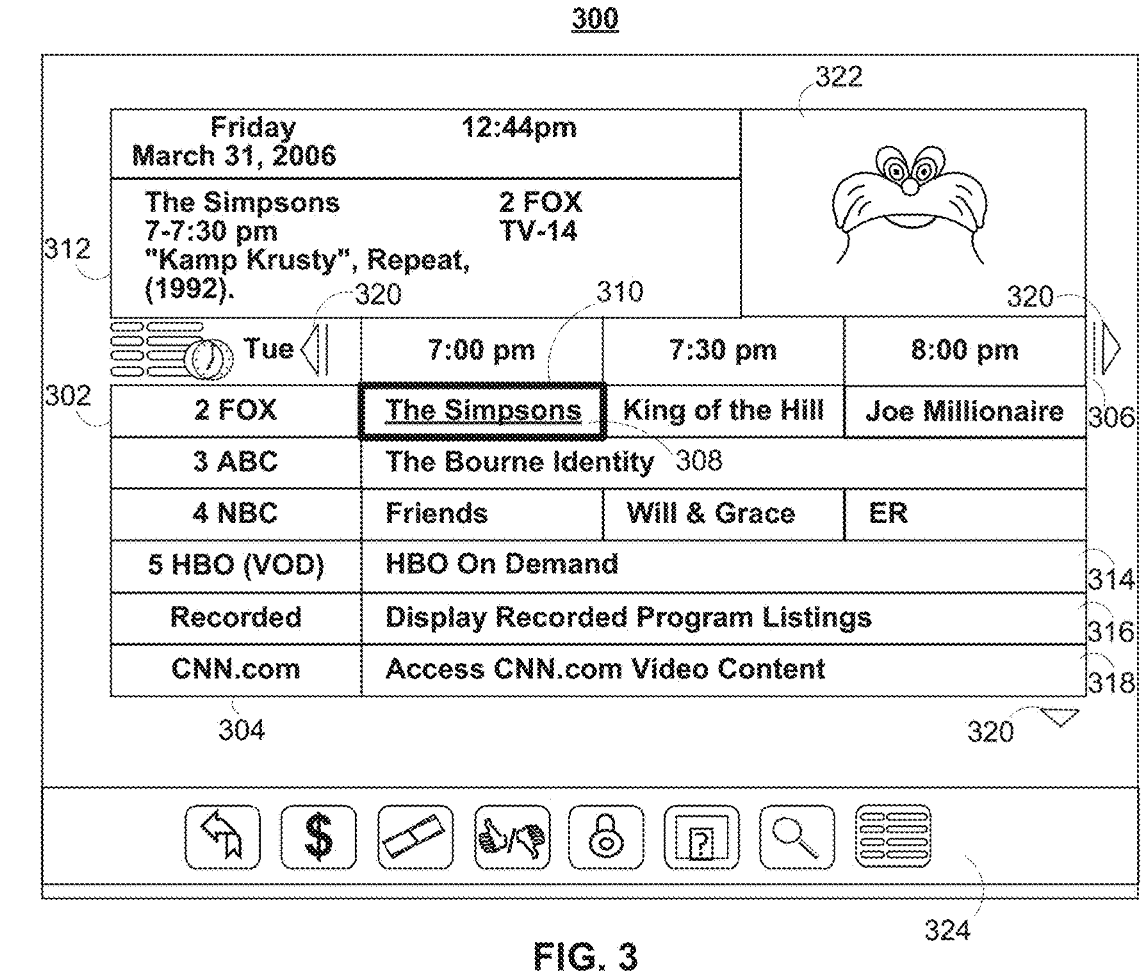
FIG. 3 shows an illustrative embodiment of a display screen that may be used to provide media guidance application listings and other media guidance information, in accordance with some embodiments of the disclosure.
Figure 4:
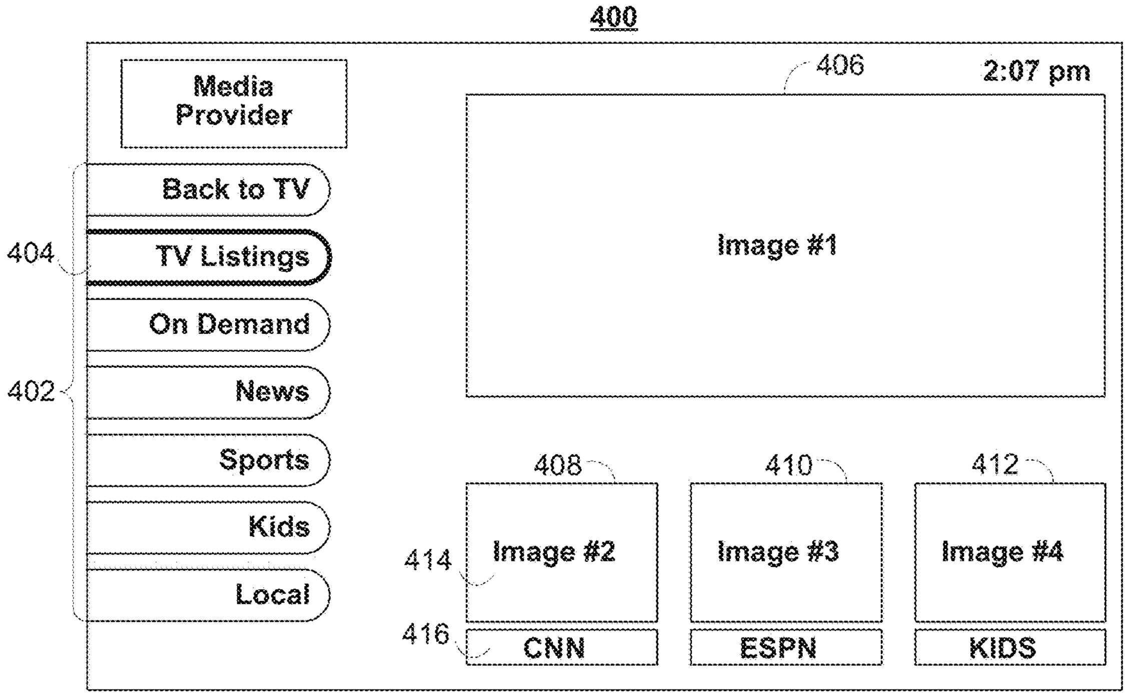
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
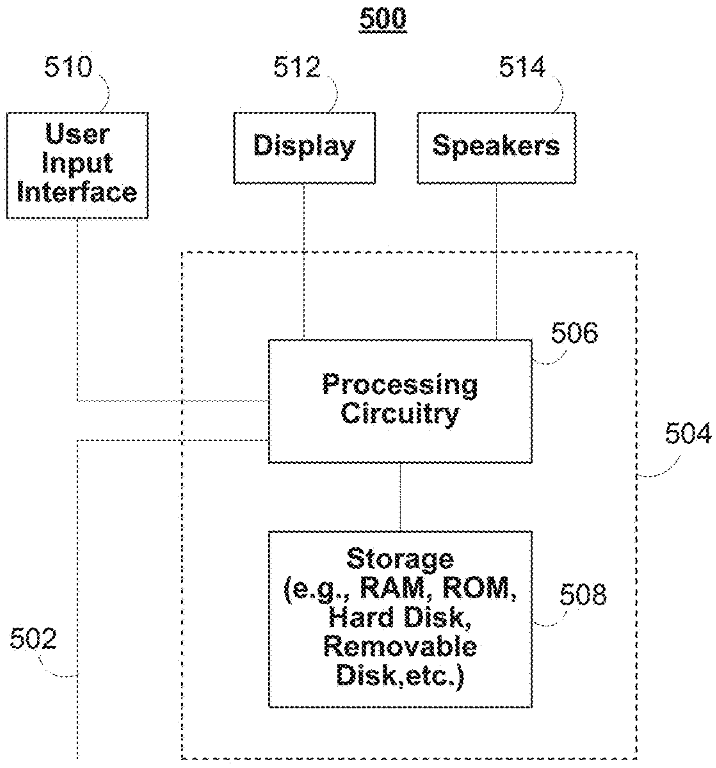
FIG. 5 is a block diagram of an illustrative device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
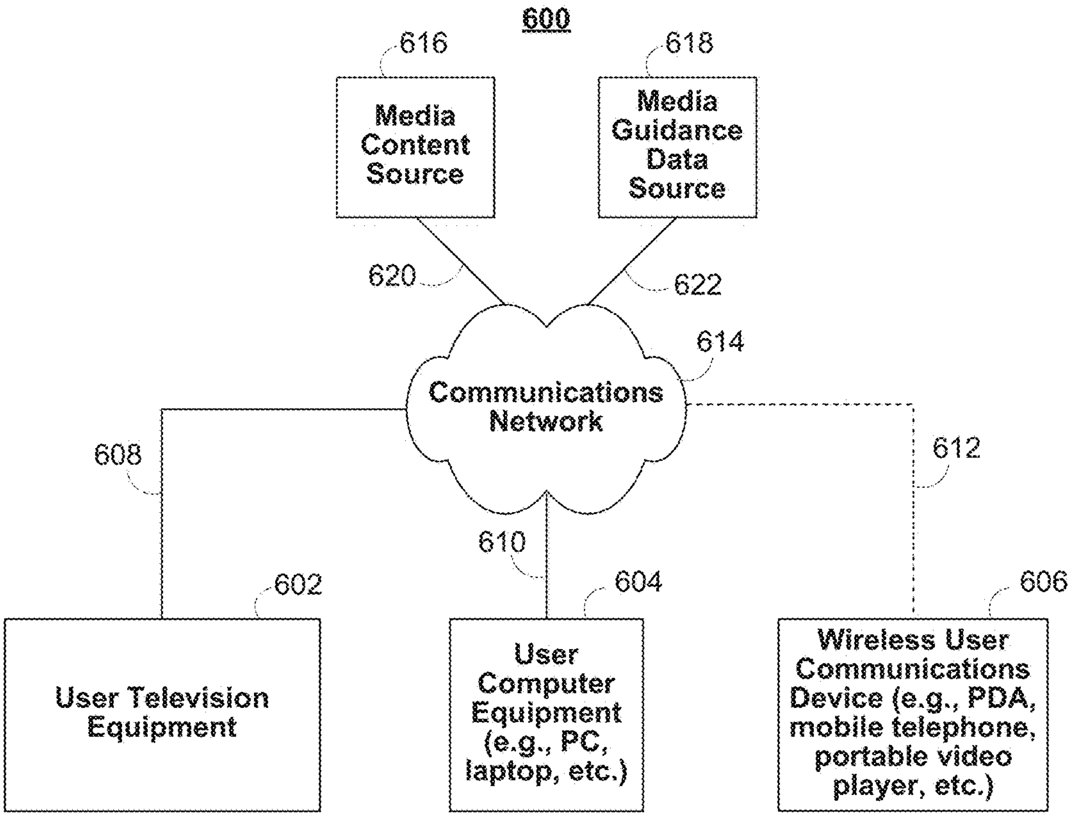
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

Figure 7:
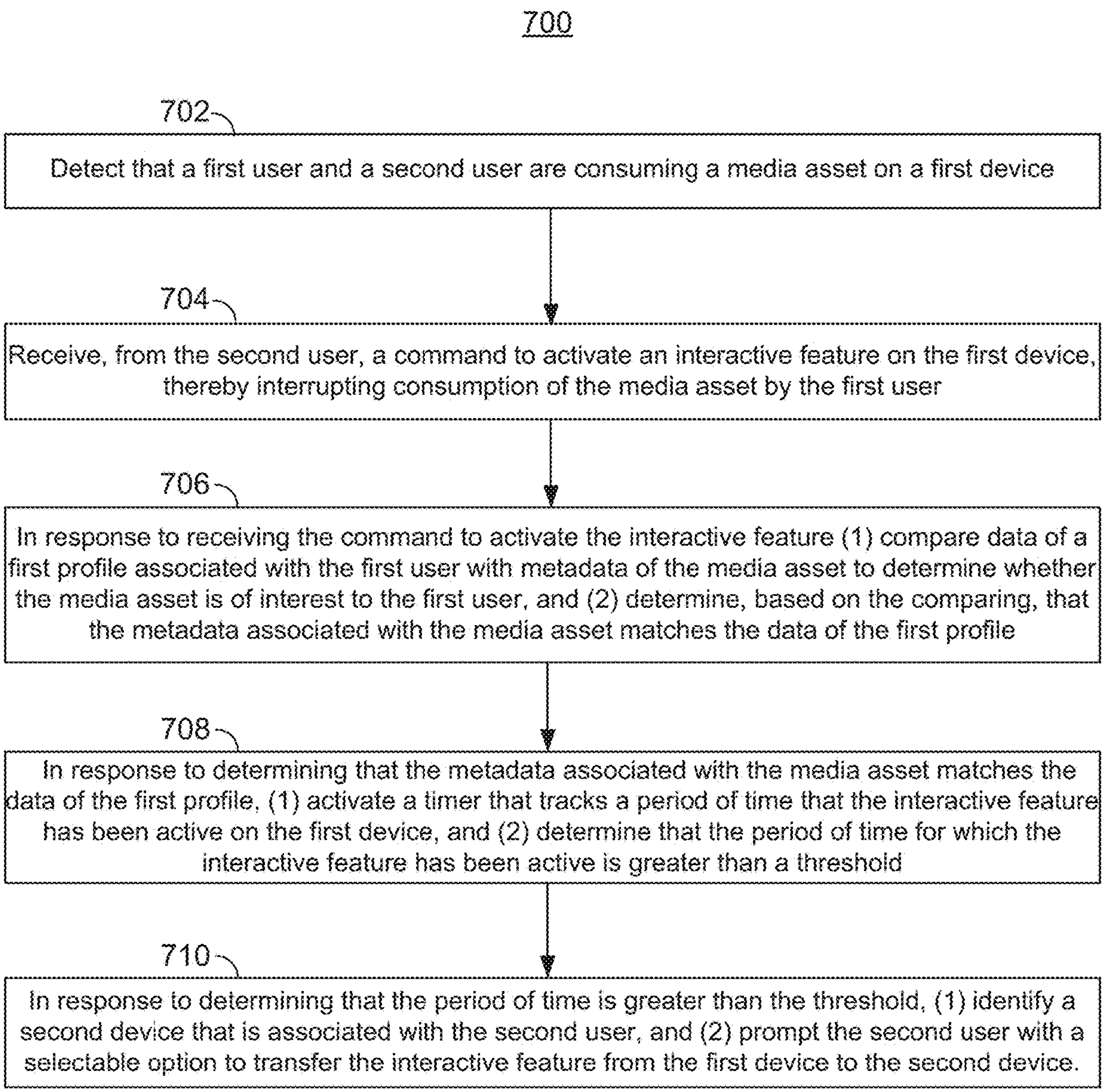
FIG. 7 depicts an illustrative process for generating for display a prompt to transfer an interactive feature from a first device to a second device, in accordance with some embodiments of this disclosure.

FIG. 7 depicts an illustrative process 700 for generating for display a prompt to transfer an interactive feature from a first device to a second device. At 702, the media guidance application may detect (e.g., via control circuitry 504) that a first user and a second user are consuming a media asset on a first device. For example, the media guidance application may reside on a user equipment device (e.g., device 602, 604, or 606). The user equipment device may include a camera. The media guidance application may activate the camera to photograph the room where the user equipment device is located. The camera may process (e.g., using processing circuitry 506) the images to detect people in the room. The media guidance application may use edge detection as a way to detect people in the room. In some embodiments, the media guidance application may execute a face recognition algorithm to identify the users (e.g., user 102 and user 104) that are consuming the media asset. It should be noted that in some embodiments, the media guidance application may transmit the images to a remote server (e.g., a server at media content source 616 and/or a server at media guidance data source 618) for detection. In some embodiments, the remote server may also identify the users that are consuming the media asset (e.g., users 103 and 104 of FIG. 1).

At 704, the media guidance application may receive (e.g., via control circuitry 504) from the second user (e.g., user 104 of FIG. 1), a command to activate an interactive feature on the first device, thereby interrupting consumption of the media asset by the first user. For example, the media guidance application may include a voice recognition module and the user can speak the command. The media guidance application may receive the command via user input interface 510 and identify the command as a request to activate the interactive feature. The media guidance application may also receive the command from a remote control or any other input device. For example, the user may activate the interactive feature by selecting the associated product on a screen (e.g., screen 200 of FIG. 1). The media guidance application may determine that the command came from user 104 by analyzing an image taken by the camera while user 104 was speaking.

At 706, the media guidance application, in response to receiving the command to activate the interactive feature, may compare (e.g., via control circuitry 504) data of a first profile associated with the first user with metadata of the media asset to determine whether the media asset is of interest to the first user, and may determine (e.g., via control circuitry 504), based on the comparing, that the metadata associated with the media asset matches the data of the first profile. For example, when the media guidance application receives the command to activate the interactive feature, the media guidance application may retrieve a first profile associated with the first user. The media guidance application may use the identities of the users discovered during the detection during action 702 to search for an associated user profile. Additionally or alternatively, the media guidance application may use images of the users taken during detection to compare those images with user photographs in the users' profiles in order to find the correct profile. The user profiles may be stored in storage 508, or on a server part of media content source 616, or media guidance data source 618. In some embodiments, the media guidance application may first attempt to identify a profile locally (e.g., in storage 508), before moving to media guidance data source 618 and/or media content source 616. It should be noted that the media guidance application may perform the search in any order.

Upon identification of the correct profile, the media guidance application may retrieve (e.g., via control circuitry 504) that profile and retrieve from that profile the associated metadata. The media guidance application may retrieve metadata of the media asset from storage 508, media content source 616, and/or from media guidance data source 618. In some embodiments, the media guidance application may first try to retrieve the metadata from stored 508 before moving onto media content source 616 and media guidance data source 618. In order to perform the comparison, the media guidance application may retrieve keywords from the user's profile indicating the type of content that is of interest to the user and compare those keywords to textual data in the metadata of the media asset. If at least one keyword matches, the media guidance application may determine that the metadata matches the profile of the first user. In some embodiments, in order for a match to be made, more than one keyword may need to be matched or a certain percentage of keywords must be matched.

In some embodiments, the media guidance application may extrapolate the user's interests from data within the user's profile. For example, the user's profile may include a list of media assets that the user has consumed over a certain period of time. The media guidance application may determine common characteristics of those media assets or at least some of those media assets (e.g., genre). The media guidance application may compare those characteristics to the metadata of the media asset in order to determine whether the metadata associated with the media asset matches the data in the user's profile.

At 708, in response to determining that the metadata associated with the media asset matches the data of the first profile, the media guidance application (1) may activate (e.g., via control circuitry 504) a timer that tracks a period of time that the interactive feature has been active on the first device, and (2) may determine (e.g., via control circuitry 504) that the period of time for which the interactive feature has been active is greater than a threshold. For example, if the media guidance application determines that the first user is interested in the media asset, the media guidance application may store a start time indicating the time when the interactive feature was activated. The media guidance application may also retrieve a threshold that indicates a time period when the first user may become impatient (e.g., one minute). In some embodiments, this time period may be associated with a particular user and be different for different users. In some embodiments, the time period may be set by a provider or by each specific user.

In some embodiments, the threshold may be generated and stored in the profile associated with the specific user (e.g., the first user) and may be retrieved by the media guidance application from that profile. The media guidance application may determine whether the threshold is met by subtracting the time when the interactive feature was activated with the current time and comparing that with the threshold. Additionally or alternatively, the media guidance application may keep a traditional timer (e.g., keep track of elapsed time since the interactive feature was activated) and compare that value with the threshold.

The media guidance application may detect that the first user started disregarding the advertisement. For example, the media guidance application may use a camera and image processing to detect that the user has turned his eyes away from the commercial for a certain amount of time. The media guidance application may generate the threshold based on a time period between a first time when the media was interrupted by the advertisement and a second time when the first user started disregarding the advertisement. For example, if the media guidance application detects that 30 seconds elapsed between the start of the commercial and the time when the user turned his or her eyes away, the media guidance application may generate a threshold of 30 seconds. In some embodiments, this process may be repeated multiple times, and an average threshold time may be generated to get a more accurate result.

At 710, in response to determining that the period of time is greater than the threshold, the media guidance application (1) may identify (e.g., via control circuitry 504) a second device that is associated with the second user, and (2) may prompt (e.g., via control circuitry 504 on display 512) the second user with a selectable option to transfer the interactive feature from the first device to the second device.

In some embodiments, the media guidance application may identify the second device that is associated with the second user by the following actions. The media guidance application may detect a plurality of accessible devices. For example, the media guidance application may reside on a device that includes a wireless network card that enables the device to detect other wireless devices in the vicinity. The media guidance application may detect those devices and determine whether they are accessible (e.g., whether an instance of the media guidance application is running on those devices). In some embodiments, the media guidance application may use the wireless network card to connect to a wireless network (e.g., a WIFI network) and detect accessible devices on the wireless network. Additionally or alternatively, the media guidance application may detect devices accessible over a Bluetooth network.

The media guidance application may determine, based on a second user profile associated with the second user, that a device of the plurality of accessible devices is associated with the second user, and identify the device as the second device. For example, each user's profile may have a list of devices associated with that user. The list of devices may include device identifications (e.g., a hardware address). The media guidance application may compare the hardware addresses in the profile associated with the second user to hardware addresses of the detected accessible devices. If the media guidance application determines that a match is found, the media guidance application may identify the matched device as the second device.

In some embodiments, the media guidance application may generate a prompt as described in relation to FIG. 1. In some embodiments, the media guidance application may, when prompting the second user with the selectable option to transfer the interactive feature from the first device to the second device, prompt the second user on the second device. For example, the media guidance application may generate a prompt on an electronic tablet associated with the second user (e.g., electronic tablet of FIG. 2). An electronic tablet may be identified as a wireless user communications device 606.

It is contemplated that the descriptions of FIG. 7 may be used with any other embodiment of this disclosure. In addition, the descriptions described in relation to the process of FIG. 7 may be done in alternative orders or in parallel to further the purposes of this disclosure. Furthermore, it should be noted that the process of FIG. 7 may be implemented on a combination of appropriately configured software and hardware, and that any of the devices or equipment discussed in relation to FIGS. 1-2 and 5-6 could be used to implement one or more portions of the process. Moreover, steps of process 700 may be used in conjunction with any step of process 800 and 900. Steps of process 700 may be omitted or replaced with any step of process 800 or 900.

Figure 8:
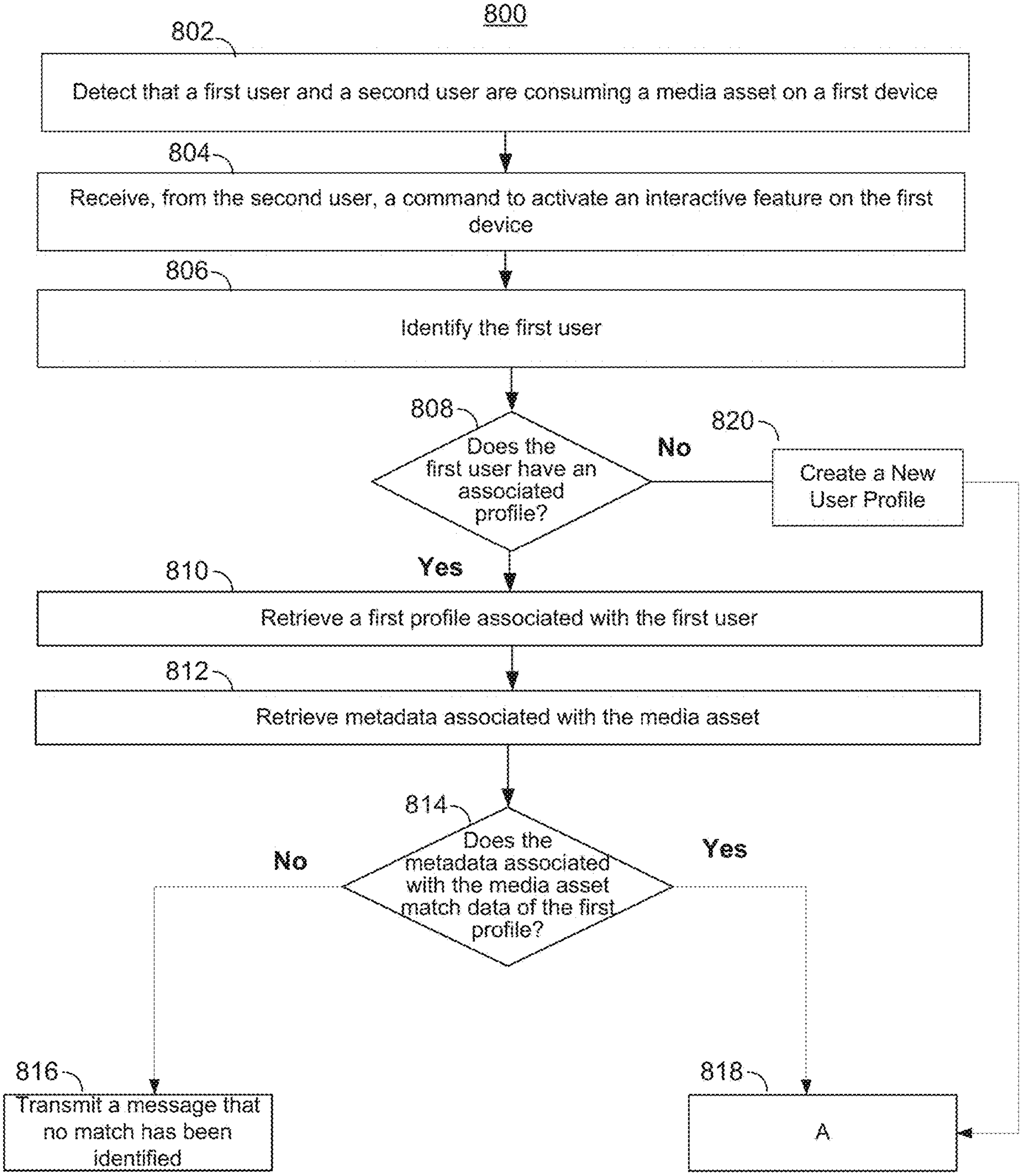
FIG. 8 depicts an illustrative process involved in determining whether the first user is interested in the media asset being played, in accordance with some embodiments of this disclosure.

FIG. 8 depicts an illustrative process 800 involved in determining whether the first user is interested in the media asset being played. At 802, the media guidance application may detect (e.g., via control circuitry 504) that a first user and a second user are consuming a media asset on a first device. Action 802 may be performed in the same manner as action 702 described in connection to FIG. 7. At 804, the media guidance application may receive (e.g., via control circuitry 504 from user input interface 510) from the second user a command to activate an interactive feature on the first device. Action 804 may be performed in the same manner as action 704 described in connection to FIG. 7.

At 806, the media guidance application may identify (e.g., via control circuitry 504) the first user. The media guidance application may use images of the users taken by a camera to compare those images with user photographs in the users' profiles in order to find the correct profile. The user profiles may be stored in storage 508, or on a server part of media content source 616, or media guidance data source 618. In some embodiments, the media guidance application may first attempt to identify a profile locally (e.g., in storage 508) before moving to media guidance data source 618 and/or media content source 616. It should be noted that the media guidance application may perform the search in any order.

At 808, the media guidance application may determine (e.g., via control circuitry 504) whether the first user has an associated profile. If the first user does not have an associated profile, process 800 moves to step 820. At 820, the media guidance application may create (e.g., via control circuitry 504) a new profile for the first user. The media guidance application may store the new profile in storage 508. Additionally or alternatively, the media guidance application may store the new profile at media content source 616 and/or media guidance data source 618. After the profile is created, process 800 moves to 818.

If the first user has an associated profile, process 800 moves to 810, where the media guidance application may retrieve (e.g., via control circuitry 504) the first profile associated with the first user. The media guidance application may retrieve the first profile from storage 508, media content source 616, or from media guidance data source 618.

At 812, the media guidance application may retrieve (e.g., via control circuitry 504) metadata associated with the media asset. The media guidance application may retrieve metadata of the media asset from storage 508, media content source 616, and/or from media guidance data source 618. In some embodiments, the media guidance application may first try to retrieve the metadata from stored 508 before moving onto media content source 616 and media guidance data source 618.

At 814, the media guidance application may determine (e.g., via control circuitry 504) whether the metadata associated with the media asset matches the data of the first profile. The media guidance application may retrieve keywords from the user's profile indicating the type of content that is of interest to the user and compare those keywords to textual data in the metadata of the media asset. If at least one keyword matches, the media guidance application may determine that the metadata matches the profile of the first user. In some embodiments, in order for a match to be made, more than one keyword may need to be matched or a certain percentage of keywords must be matched.

In some embodiments, the media guidance application may extrapolate the user's interests from data within the user's profile. For example, the user's profile may include a list of media assets that the user has consumed over a certain period of time. The media guidance application may determine common characteristics of those media assets, or at least some of those media assets (e.g., genre). The media guidance application may compare those characteristics to the metadata of the media asset in order to determine whether the metadata associated with the media asset matches the data in the user's profile.

If the metadata associated with the media asset does not match the data of the first profile, process 800 moves to 816, where the media guidance application transmits (e.g., via control circuitry 504 through I/O Path 502) a message that no match has been identified. This message may be a system message indicating that process 800 is to end. If the metadata associated with the media asset matches the data of the first profile, process 800 moves to 818. Process 900 takes over processing at this point.

It is contemplated that the descriptions of FIG. 8 may be used with any other embodiment of this disclosure. In addition, the descriptions described in relation to the process of FIG. 8 may be done in alternative orders or in parallel to further the purposes of this disclosure. Furthermore, it should be noted that the process of FIG. 8 may be implemented on a combination of appropriately configured software and hardware, and that any of the devices or equipment discussed in relation to FIGS. 1-2 and 5-6 could be used to implement one or more portions of the process. Moreover, steps of process 800 may be used in conjunction with any step of process 700 and 900. Steps of process 800 may be omitted or replaced with any step of process 700 or 900.

Figure 9:
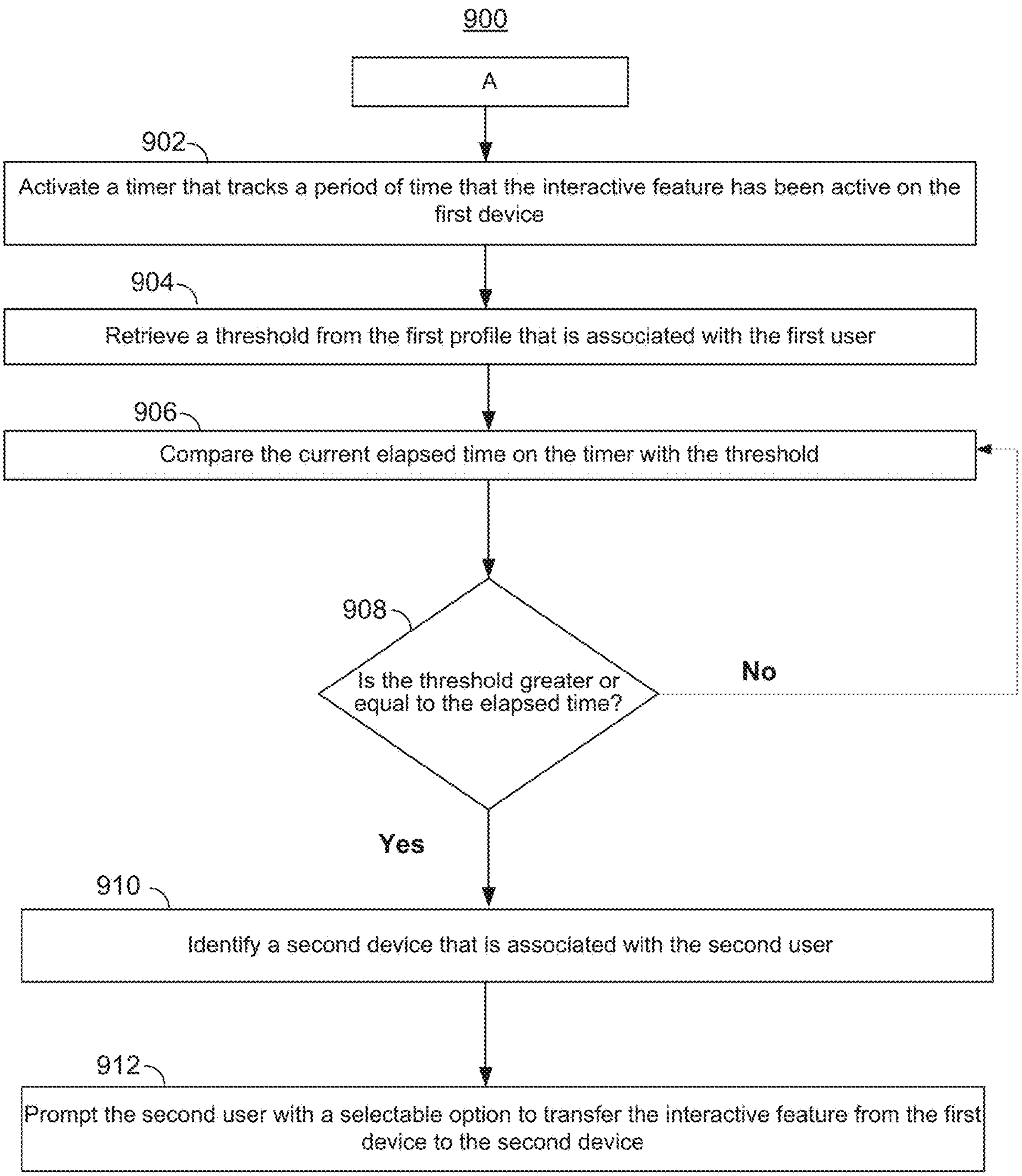
FIG. 9 depicts an illustrative process for generating a prompt to transfer an interactive feature from a first device to a second device based on a threshold time, in accordance with some embodiments of this disclosure.

FIG. 9 depicts an illustrative process 900 for generating a prompt to transfer an interactive feature from a first device to a second device based on a threshold time. At 902, the media guidance application may activate (e.g., via control circuitry 504) a timer that tracks a period of time that the interactive feature has been active on the first device. For example, the media guidance application may store a start time indicating the time when the interactive feature was activated and later compare the stored time with the future current time to keep track of the period of time that the interactive feature has been active. Additionally or alternatively, the media guidance application may start a timer at 0 and update the value as time elapses.

At 904, the media guidance application may retrieve (e.g., via control circuitry 504) a threshold from the first profile that is associated with the first user. For example, the media guidance application may retrieve the threshold from a profile stored locally in storage 508 or remotely at media guidance data source 618 or media content source 616. At 906, the media guidance application compares (e.g., via control circuitry 504) the current elapsed time on the timer with the threshold. This process may be implemented as described in relation to process 700 of FIG. 7. At 908, the media guidance application may determine (e.g., via control circuitry 504) whether the threshold is greater or equal to the elapsed time. If the threshold is not greater or equal to the elapsed time, process 900 moves to step 906, where the comparison is done again. If the threshold is greater or equal to the elapsed time, process 900 moves to 910.

At 910, the media guidance application may identify (e.g., via control circuitry 504) a second device that is associated with the second user. At 912, the media guidance application prompts (e.g., via control circuitry 504) the second user with a selectable option to transfer the interactive feature from the first device to the second device. Actions 910 and 912 may be performed similarly to action 710 of FIG. 7.

It is contemplated that the descriptions of FIG. 9 may be used with any other embodiment of this disclosure. In addition, the descriptions described in relation to the process of FIG. 9 may be done in alternative orders or in parallel to further the purposes of this disclosure. Furthermore, it should be noted that the process of FIG. 9 may be implemented on a combination of appropriately configured software and hardware, and that any of the devices or equipment discussed in relation to FIGS. 1-2 and 5-6 could be used to implement one or more portions of the process. Moreover, steps of process 900 may be used in conjunction with any step of processes 700 and 800. Steps of process 900 may be omitted or replaced with any step of process 700 or 800.

In some embodiments, it may be useful to refrain from activating the time (e.g., in instances where the first user is not interested in the media asset. Specifically, in response to determining that the metadata associated with the media asset does not match the data of the first profile, the media guidance application may refrain from activating the timer and refrain from prompting the second user with the selectable option to transfer the interactive feature from the first device to the second device.

In some embodiments, it may be useful to increase the threshold from a default, for example, because the first user is interested in the interactive feature. The media guidance application may determine, based on the data in the first profile associated with the first user, that the first user is interested in the interactive feature. The media guidance application may retrieve metadata associated with the interactive feature. The media guidance application may retrieve the metadata from storage 508, from media content source 616, or from media guidance data source 618. In some embodiments, the media guidance application may first attempt to retrieve the metadata from storage 508 and afterwards from media content source 616 and media guidance data source 618.

The media guidance application may increase the threshold based on the determining. For example, if the threshold is thirty seconds, the media guidance application may double it to one minute. The increase factor (e.g., 2X) may be determined by the service provider and may be modified by the user.

In some embodiments the threshold may be generated by monitoring how fast a specific user becomes impatient when watching an advertisement, presumably content that the user is not interested in. Specifically, the media guidance application may determine that media currently being consumed by the first user has been interrupted by an advertisement. The media guidance application may make this determination by various methods such as image processing, blank frame detection, and other methods. The media guidance application may store a time associated with the start of the advertisement. The media guidance application may detect that the first user started disregarding the advertisement, by, for example, tracking that the user's eyes have turned away from the media asset, as discussed above. When the media guidance application determines that the user has turned away from the advertisement, the media guidance application may store a time when the user has turned away.

The media guidance application may generate the threshold based on a time period between a first time when the media was interrupted by the advertisement and a second time when the first user started disregarding the advertisement. For example, the media guidance application may subtract the time when the advertisement started from the time when the user has turned his or her eyes away from the advertisement. In some embodiments, the media guidance application may, instead of or in addition to storing the time of when the advertisement started, initiate a time and then stop the timer when the user turns his or her eyes away from the media asset. The media guidance application may generate the threshold based on the timer.

In some embodiments, it may be useful to prompt the users to transfer the interactive feature back to the first device, if the first user is disregarding the media asset. The media guidance application may receive a user selection of the selectable option. The media guidance application may receive the user selection through user input interface 510 from, for example, a remote control or another suitable device.

The media guidance application may transfer the interactive feature from the first device to the second device. For example, the media guidance application may remove overlays 106 and 110 of FIG. 1 from the screen associated with user equipment 108 and continue with the media asset that is being consumed. The media guidance application may stream (e.g., through a wireless network) the content to the second device. In some embodiments, the media guidance application may stream the content associated with the interactive feature from the first device. In some embodiments, the media guidance application may stream the interactive feature from a home server or a remote server that is associated with media content source 616 or media guidance data source 618.

The media guidance application may detect that the first user is disregarding the media asset. For example, the media guidance application may determine that the user is not looking in the direction of the device that is playing the media asset by using a camera and an edge detection algorithm. In some embodiments, the media guidance application may make the detection on a user device (e.g., device 602, 604, or 606) where the media guidance application resides. In some embodiments, the media guidance application may transmit the images to a remote server (e.g., a server at media content source 616 and/or media guidance data source 618) and request that the server perform image analysis to detect that the user is disregarding the media asset.

In response to detecting that the first user is disregarding the media asset, the media guidance application may generate for display a selectable option to transfer the interactive feature from the second device back to the first device. The selectable option may be generated for display in the same manner as a selectable option to transfer the interactive feature originally from the first device to the second device. The selectable option may be generated for display on the first device (e.g., device of FIG. 1) or on a second device (e.g., device of FIG. 2).

In some embodiments, the media guidance application may take the following actions to detect that the first user is disregarding the media asset. The media guidance application may detect that the user's eyes are not turned in the direction of the media asset. The media guidance application may perform the detection by using a camera. The media guidance application may use edge detection to detect different users in the images and, based on the user's facial features and the user's eyes (e.g., viewing direction), determine that the user's eyes are not turned in the direction of the media asset.

The media guidance application may activate a timer that tracks a period of time that the user's eyes are not turned in the direction of the media asset. The media guidance application may also use a camera to perform the tracking. The media guidance application may determine, based on the timer, that the period of time for which the user's eyes are not turned in the direction of the media asset is greater than a threshold. For example, it may not be useful to detect that the first user is disregarding the media asset if the user has turned away from the media asset for a short period of time (e.g., 5 seconds). However, if the user has turned away for a substantial amount of time (e.g., 3 minutes) it may be useful to detect that the user is disregarding a media asset. Based on the determination, the media guidance application may detect that the user is disregarding the media asset.

In some embodiments, it may be useful to prompt the user to transfer the interactive feature to a device associated with the first user, for example, when the media guidance application determines that an accessible device cannot be found for the second user. The media guidance application may detect a plurality of accessible devices. The media guidance application may perform the detection in the same manner as described in relation to process 700, action 710.

The media guidance application may determine that a first accessible device of the plurality of accessible devices is associated with the first user. The media guidance application may perform the detection in the same manner as described in relation to process 700, action 710. The media guidance application may generate for display, on the first accessible device, a prompt to transfer the interactive feature to the first accessible device. This may be a prompt similar to prompt 204 of FIG. 2.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:

detecting an interruption of a media asset being consumed by a first user and a second user on a first device, wherein the interruption is caused by displaying of an interactive feature having a plurality of attributes, wherein the displaying is in response to a selection by the second user;

in response to detecting the interruption, comparing an attribute of a first profile associated with the first user with an attribute of the plurality of attributes of the interactive feature;

based on the comparing, determining that the attribute of the interactive feature matches the attribute of the first profile; and in response to determining that the attribute of the interactive feature matches the attribute of the first profile, delaying providing for display an option to transfer the interactive feature from the first device to a second device.

2. The method of claim 1, wherein the first profile further comprises an attention threshold related to the interactive feature and wherein the method further comprises:

in response to determining that the attribute of the interactive feature matches the attribute of the first profile, increasing the attention threshold related to the interactive feature; and in response to increasing the attention threshold related to the interactive feature, delaying providing for display the option to transfer the interactive feature from the first device to the second device.

3. The method of claim 2, wherein increasing the attention threshold related to the interactive feature comprises doubling the attention threshold associated with the first profile.

4. The method of claim 2, wherein the attention threshold is based on a time period between a first time when the media asset was interrupted by the interactive feature and a second time when the first user started disregarding the interactive feature.

5. The method of claim 4, further comprising:

tracking a gaze of the first user via a camera associated with the first device; and determining based on the gaze of the first user being directed away from the interactive feature, that the first user has become not interested in the interactive feature.

6. The method of claim 1, wherein the media asset comprises a plurality of attributes, the method further comprises:

comparing the attribute of the first profile associated with the first user with an attribute of the plurality of attributes of the media asset;

determining that the attribute of the media asset matches the attribute of the first profile;

in response to determining the attribute of the media asset matches the attribute of the first profile, initiating a timer that tracks a period of time that the interactive feature has been active on the first device; and in response to determining the timer exceeds a threshold amount of time, providing for display the option to transfer the interactive feature from the first device to the second device.

7. The method of claim 6, wherein initiating the timer in response to determining the attribute of the media asset matches the attribute of the first profile, the method further comprises:

in response to determining that the attribute of the media asset does not match the attribute of the first profile, refraining from activating the timer and refraining from providing for display the option to transfer the interactive feature from the first device to the second device.

8. The method of claim 1, further comprising:

detecting a plurality of accessible devices;

determining, based on a second user profile associated with the second user, that a device of the plurality of accessible devices is associated with the second user; and identifying the device as the second device.

9. The method of claim 1, wherein the option to transfer the interactive feature from the first device to the second device is provided for display on the first device or the second device to which the interactive feature will be transferred.

10. The method of claim 1, further comprising:

receiving a user selection of the option to transfer the interactive feature from the first device to the second device;

transferring the interactive feature from the first device to the second device;

detecting that the first user is disregarding the media asset on the first device; and in response to detecting that the first user is disregarding the media asset on the first device, providing for display the option to transfer the interactive feature from the second device back to the first device.

11. A system comprising:

control circuitry configured to:

detect an interruption of a media asset being consumed by a first user and a second user on a first device, wherein the interruption is caused by displaying of an interactive feature having a plurality of attributes, wherein the displaying is in response to a selection by the second user;

in response to detecting the interruption, compare an attribute of a first profile associated with the first user with an attribute of the plurality of attributes of the interactive feature;

based on the comparing, determine that the attribute of the interactive feature matches the attribute of the first profile; and in response to determining that the attribute of the interactive feature matches the attribute of the first profile, delay providing for display an option to transfer the interactive feature from the first device to a second device.

12. The system of claim 11, wherein the first profile further comprises an attention threshold related to the interactive feature and wherein the control circuitry is further configured to:

in response to determining that the attribute of the interactive feature matches the attribute of the first profile, increase the attention threshold related to the interactive feature; and in response to increasing the attention threshold related to the interactive feature, delay providing for display the option to transfer the interactive feature from the first device to the second device.

13. The system of claim 12, wherein increasing the attention threshold related to the interactive feature comprises doubling the attention threshold associated with the first profile.

14. The system of claim 12, wherein the attention threshold is based on a time period between a first time when the media asset was interrupted by the interactive feature and a second time when the first user started disregarding the interactive feature.

15. The system of claim 14, wherein the control circuitry is further configured to:

track a gaze of the first user via a camera associated with the first device; and determine based on the gaze of the first user being directed away from the interactive feature, that the first user has become not interested in the interactive feature.

16. The system of claim 11, wherein the media asset comprises a plurality of attributes, the control circuitry is further configured to:

compare the attribute of the first profile associated with the first user with an attribute of the plurality of attributes of the media asset;

determine that the attribute of the media asset matches the attribute of the first profile;

in response to determining the attribute of the media asset matches the attribute of the first profile, initiate a timer that tracks a period of time that the interactive feature has been active on the first device; and in response to determining the timer exceeds a threshold amount of time, provide for display the option to transfer the interactive feature from the first device to the second device.

17. The system of claim 16, wherein initiating the timer in response to determining the attribute of the media asset matches the attribute of the first profile, the control circuitry is further configured to:

in response to determining that the attribute of the media asset does not match the attribute of the first profile, refrain from activating the timer and refraining from providing for display the option to transfer the interactive feature from the first device to the second device.

18. The system of claim 11, wherein the control circuitry is further configured to:

detect a plurality of accessible devices;

determine, based on a second user profile associated with the second user, that a device of the plurality of accessible devices is associated with the second user; and identify the device as the second device.

19. The system of claim 11, wherein the option to transfer the interactive feature from the first device to the second device is provided for display on the first device or the second device to which the interactive feature will be transferred.

20. The system of claim 11, wherein the control circuitry is further configured to:

receive a user selection of the option to transfer the interactive feature from the first device to the second device;

transfer the interactive feature from the first device to the second device;

detect that the first user is disregarding the media asset on the first device; and in response to detecting that the first user is disregarding the media asset on the first device, provide for display the option to transfer the interactive feature from the second device back to the first device.

* * * * *